US012507609B2

(12) United States Patent
Ekhe et al.

(10) Patent No.: US 12,507,609 B2
(45) Date of Patent: Dec. 30, 2025

(54) CONVERTIBLE TWO RANK AGRICULTURAL IMPLEMENT

(71) Applicant: Deere & Company, Moline, IL (US)

(72) Inventors: Sandeep Ekhe, Ahmednagar (IN); Vijay Bhaskar Shashidhar Ayyalasomayajula, Nagpur (IN)

(73) Assignee: Deere & Company, Moline, IL (US)

( * ) Notice: Subject to any disclaimer, the term of this patent is extended or adjusted under 35 U.S.C. 154(b) by 815 days.

(21) Appl. No.: 17/854,288

(22) Filed: Jun. 30, 2022

(65) Prior Publication Data

US 2024/0000004 A1    Jan. 4, 2024

(51) Int. Cl.
*A01B 73/00*    (2006.01)
*A01B 71/00*    (2006.01)
*A01C 7/08*    (2006.01)
*B60D 1/173*    (2006.01)
*B60D 1/52*    (2006.01)

(52) U.S. Cl.
CPC .............. *A01B 73/00* (2013.01); *A01B 71/00* (2013.01); *A01C 7/08* (2013.01); *B60D 1/173* (2013.01); *B60D 1/52* (2013.01)

(58) Field of Classification Search
CPC .......... B60D 1/173; B60D 1/52; A01B 63/24; A01B 63/245; A01B 73/00; A01B 73/06; A01B 73/067; A01B 71/00; A01C 7/00; A01C 7/20; A01C 7/08; A01C 7/208
See application file for complete search history.

(56) References Cited

U.S. PATENT DOCUMENTS

| 4,461,356 A | * | 7/1984 | Larson | ................. | A01B 73/067 172/689 |
| 4,646,851 A | * | 3/1987 | Duello | ................. | A01B 73/067 172/689 |
| 4,843,983 A | * | 7/1989 | Olson | ..................... | F16L 37/58 285/240 |
| 5,535,688 A | * | 7/1996 | Kaufman | ............... | A01D 43/12 172/474 |

(Continued)

OTHER PUBLICATIONS

Extended European Search Report and Written Opinion issued in European Patent Application No. 23178370.5, dated Dec. 4, 2023, in 09 pages.

*Primary Examiner* — Adam J Behrens
(74) *Attorney, Agent, or Firm* — Taft Stettinius & Hollister LLP; Stephen F. Rost

(57) ABSTRACT

A convertible multiple rank agricultural implement for being towed by an agricultural vehicle. The convertible multiple rank agricultural implement includes a towing assembly, a first rank coupled to the towing assembly, wherein the first rank includes a first plurality of row units longitudinally spaced along a longitudinally extending support structure. A second rank is coupled to the first rank, wherein the second rank includes a first section connected to a second plurality of row units, and a second section connected to a third plurality of row units. In a first configuration, the first section and second section are coupled together with a coupler located at adjacent ends of the first section and second section when the second rank is offset and spaced from the first rank. In a second configuration, the first section and second section are spaced apart and longitudinally aligned with the longitudinally extending support structure of the first rank.

14 Claims, 13 Drawing Sheets

(56) References Cited

U.S. PATENT DOCUMENTS

| | | | | |
|---|---|---|---|---|
| 5,720,352 | A | * | 2/1998 | Tharaldson .......... A01B 59/042 |
| | | | | 172/310 |
| 5,974,986 | A | | 11/1999 | Trisler |
| 6,205,937 | B1 | * | 3/2001 | Shoup ................... A01B 73/00 |
| | | | | 172/311 |
| 12,096,710 | B2 | * | 9/2024 | DeKam ................. A01B 76/00 |
| 2007/0266917 | A1 | | 11/2007 | Riewerts et al. |
| 2009/0014190 | A1 | * | 1/2009 | Wake ..................... A01C 7/208 |
| | | | | 172/242 |
| 2017/0006762 | A1 | * | 1/2017 | Dienst .................. A01B 73/065 |
| 2019/0021212 | A1 | * | 1/2019 | Boriack ................ A01B 63/22 |
| 2020/0383263 | A1 | * | 12/2020 | Rice ..................... A01B 79/005 |
| 2022/0117145 | A1 | * | 4/2022 | Tedeschi ............. A01B 73/005 |

* cited by examiner

CONVERTIBLE TWO RANK AGRICULTURAL IMPLEMENT

FIELD OF THE DISCLOSURE

The present disclosure relates to an agricultural implement, and in particular, to an agricultural implement having two or more ranks, each having one or more row units.

BACKGROUND

An agricultural fertilizer spreader implement or agricultural seed planter implement deposits fertilizer in rows or seed in rows as the implements are pulled by a work vehicle, such as a tractor, through an agricultural field for planting. Combination fertilizer spreaders/planter deposit fertilizer in rows followed by planting seeds along the same row that have received the fertilizer. In these types of agricultural implements, the fertilizer spreader precedes a row crop planter such that the ground is fertilized prior to the seeds being deposited.

These agricultural implements typically each include a plurality of row units coupled to each of the ranks, wherein the ranks are inclined and extend substantially perpendicular to the direction of travel when pulled through the agricultural field. A first rank of row units is spaced from a second rank of row units. In the case where fertilizing and seeding occur at the same time, a plurality of row units are aligned side by side along one of the ranks to form a multi-row implement. For instance, in one embodiment, a multi-row implement includes eleven row units spaced equally apart along the rank. In an agricultural implement configured to either fertilize only or to fertilize and deposit seeds at the same time, the fertilizer row units and seeding row units of the apparatus are aligned and deposit product substantially parallel to the travel direction of the tractor when being pulled through a field.

Farm operators often purchase a two rank tool so that the operator or user receives a dual row spacing option for different types of seeds to be planted. In such two rank tools, the operator plants seeds of one type requiring a first spacing and seeds of a second type requiring a second spacing. For example, if the operator plants both soybean and corn crops, the soybeans must be planted in rows that are space apart by substantially 7.5 inches. Corn, however, is planted in rows that are spaced apart by substantially 15 inches. In each case, the row spacing is selected to provide better yield.

In a currently known two rank planter, the first rank includes row units spaced 15 inches apart and the second rank includes row units also spaced 15 inches apart. By laterally offsetting the second rank with respect to the first rank each row unit of the entire implement is spaced substantially 7.5 inches apart, the spacing required for planting soybean. When the operator intends to plant corn, however, the spacing of row units must be substantially 15 inches. In this situation one of the ranks is not needed, so one rank needs to be rendered inoperative.

Consequently, the operator is faced with alternative choices regarding how to render the unused rank inoperative. One choice includes leaving both ranks in place, but using only one to plant seed. In this case, the rank that is not seeding is pulled along unnecessarily during seeding. Another choice is to remove the unused rank completely from the implement. A third choice is to raise and lock the unused rank in an elevated position so that only one rank is planting. Each of these choices, while providing the needed spacing, can result in an overall loss of money, fuel, time, and labor. What is needed therefore is a farm implement that reduces or eliminates certain difficulties associated with a two rank farm implement.

SUMMARY

In one embodiment, there is provided a convertible multiple rank agricultural implement for being towed by an agricultural vehicle having a towing assembly and a first rank coupled to the towing assembly. The first rank includes a first plurality of row units longitudinally spaced along a longitudinally extending support structure and a second rank coupled to the first rank. The second rank includes a first section connected to a second plurality of row units, and a second section connected to a third plurality of row units, wherein the first section and second section, in a first configuration, are coupled together with a coupler located at adjacent ends of the first section and second section when the second rank is offset and spaced from the first rank, and wherein the first section and second section, in a second configuration, are spaced apart and longitudinally aligned with the longitudinally extending support structure of the first rank.

In some embodiments, the convertible multiple rank agricultural implement includes wherein the towing assembly has a first set of drawbars and a second set of drawbars, wherein the first set of drawbars is connected to the first rank and the second set of drawbars is coupled to the second rank.

In some embodiments, convertible multiple rank agricultural implement includes wherein the second rank includes adjustable drawbars, wherein each of the second set of adjustable drawbars includes a first part that slides respectively with a second part, and wherein the second set of adjustable drawbars includes a retracted position and an extended position.

In some embodiments, the convertible multiple rank agricultural implement includes wherein the adjustable drawbars include a towing end adapted to be connected to the agricultural vehicle and a tool end adapted to be connected to the one of the first rank or the second rank, wherein the towing end is closer to the agricultural vehicle than the tool end.

In some embodiments, the convertible multiple rank agricultural implement includes wherein the adjustable drawbars in a first position are coupled to the first rank and the second rank, when the first rank is offset from and spaced from the second rank.

In some embodiments, the convertible multiple rank agricultural implement includes wherein the adjustable tow bars in a second position are coupled to the second rank and the towing assembly when the first section and second section are arranged in the second configuration.

In some embodiments, the convertible multiple rank agricultural implement includes wherein the adjustable tow bars in the second configuration are in the extended position.

In some embodiments, the convertible multiple rank agricultural implement includes wherein the coupler of the second rank includes a first part located at a first end of the first section and a second part located at a second end of the second section, wherein engagement of the first part and the second part couples the first section to the second section.

In some embodiments, the convertible multiple rank agricultural implement includes wherein the longitudinally extending support structure includes a first connector at one end of the support structure and a second connector at another end of the support structure, wherein engagement of the first part with the first connector connects the first section to one end of the support structure and engagement of the second part with the second connector connects the second section to an another end of the support structure in the second configuration.

In some embodiments, the convertible multiple rank agricultural implement includes wherein the coupler includes an electrical coupler having a first electrical part and a second electrical part, the first electrical part located at the first end of the first section and the second electrical part located at the second end of the second section, wherein engagement of the first electrical part and the second electrical part electrically couples the first section to the second section.

In some embodiments, the convertible multiple rank agricultural implement includes wherein the longitudinally extending support structure includes a first electrical connector at the one end of the support structure and a second electrical connector at the another end of the support structure wherein engagement of the first electrical part with the first electrical connector and engagement of the second electrical part with the second electrical connector electrically connects the first section at the one end of the support structure and electrically connects the second section at the another end of the support structure in the second configuration.

In some embodiments, the convertible multiple rank agricultural implement includes wherein the longitudinally extending support structure, the first section, and the second section, each support row units of a type of one of a tillage unit, a seeding unit, or a fertilizer unit.

In another embodiment, there is provided a method of converting an agricultural implement having a first tow bar and a second tow bar from a multiple rank agricultural implement to a single rank agricultural implement. The method includes: providing a first rank, the first rank including a first plurality of row units longitudinally spaced along a longitudinally extending support structure; providing a separable second rank having a first section and a second section, wherein each of the first section and the second section include respectively a second plurality of row units and a third plurality of row units; separating the separable second rank into the first section and a second section; adjusting a length of the first tow bar to enable connection of the first section to one portion of the first rank; adjusting a length of the second tow bar to enable connection of the second section to another portion of the first rank; moving the first section and second section into longitudinal alignment with the first rank; connecting the first section to the one end of the first rank; and connecting the second section to the another end of the second rank.

In some embodiments, the method includes wherein the providing a separable second rank includes providing an mechanical coupler system having a first mechanical part and a second mechanical part, the mechanical coupler system located at adjacent ends of the first section and the second section before separation; coupling the first mechanical part to the one end of the non-separable first rank; and coupling the second mechanical part to the another end of the non-separable first rank.

In some embodiments, the method includes wherein the providing a separable second rank includes providing an electrical coupler system having a first electrical part and a second electrical part, the electrical coupler system located at adjacent ends of the first section and the second section before separation; coupling the first electrical part to a first electrical connector at the one end of the first rank; and coupling the second electrical part to a second electrical connector at the another end of the first rank.

In some embodiments, the method includes wherein the providing the first rank and the separable second rank and each includes the plurality of row units as a type of one of a tillage unit, a seeding unit, or a fertilizer unit.

In a further embodiment, there is provided an agricultural system for cultivating crops including an agricultural work vehicle having a towing hitch and a towing assembly adapted to couple to the towing hitch, wherein the towing assembly includes a first set of drawbars and a second set of drawbars. A first rank is coupled to the first set of drawbars, wherein the first rank includes a first plurality of row units longitudinally spaced along a longitudinally extending support structure. A second rank is coupled to the second set of tow bars, wherein the second rank includes a first section connected to a second plurality of row units, and a second section connected to a third plurality of row units. The first section and second section, in a first configuration, are coupled together with a coupler located at adjacent ends of the first section and second section when the second rank is offset and spaced from the first rank. The first section and second section, in a second configuration, are spaced apart and longitudinally aligned with the longitudinally extending support structure.

In some embodiments, the agricultural system includes wherein the adjustable drawbars include a towing end adapted to be connected to the agricultural vehicle and a tool end adapted to be connected to the one of the first rank or the second rank, wherein the towing end is closer to the agricultural vehicle than the tool end.

In some embodiments, the agricultural system includes wherein the adjustable tow bars in the second position are coupled to the second rank when the first section and second section, in the second configuration, are spaced apart and longitudinally aligned with the longitudinally extending support structure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
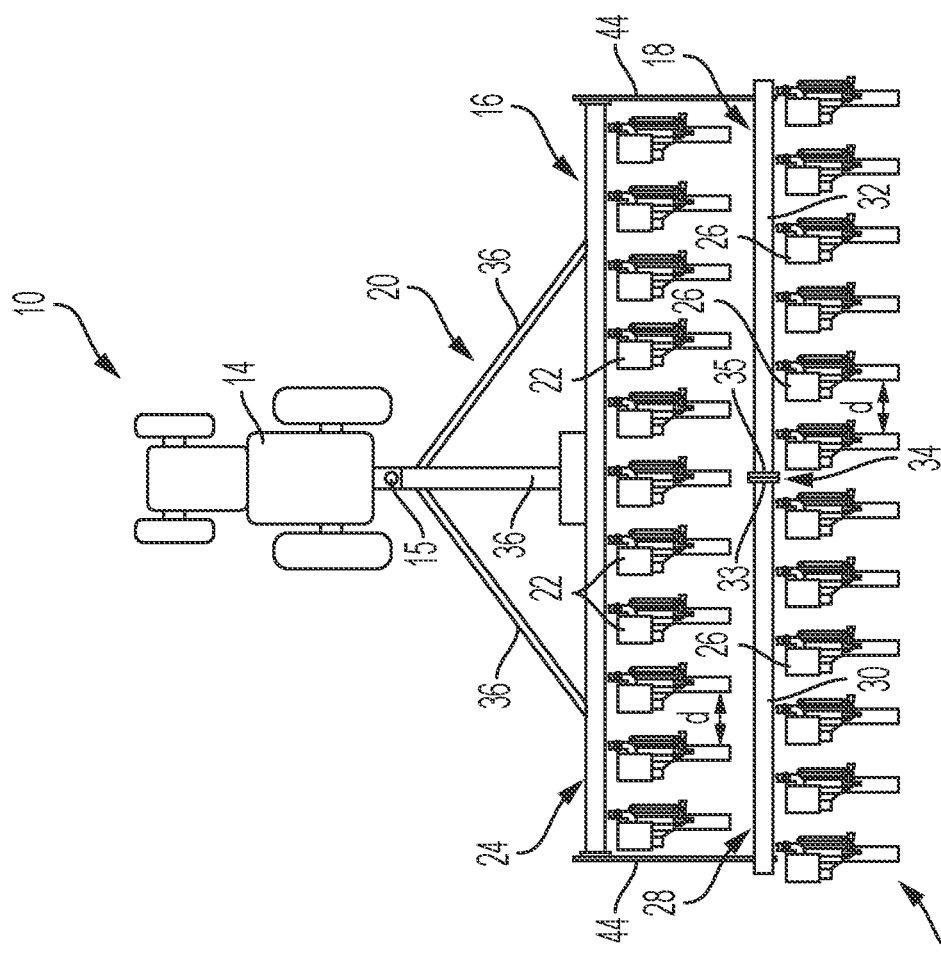
FIG. 1 is a plan view of an agricultural system including a convertible multi-rank farm implement in a first configuration pulled by a work vehicle.

Referring to the drawings, and more particularly to FIG. 1, there is shown an embodiment of an agricultural system 10 including a multi-rank agricultural tool or implement 12. In the embodiment shown, the agricultural tool 12 is a multi-rank seeder, but in other embodiments, the agricultural tool 12 may be a multi-rank fertilizer spreader or a multi-rank combination fertilizer spreader and seeder. The multi-rank tool 12 may include a first rank 16 and a second rank 18. The second rank 18 may be spaced from and offset from the first rank 16. A work vehicle 14, in the form of a tractor includes a hitch 15 which may be coupled to and moves the implement 12 with a suitable coupling arrangement, i.e. towing assembly 20. Other embodiments are contemplated including an autonomous tractor pulling the implement 12, as well as an entirely self-contained autonomous fertilizer/seeder, including the row units and a propulsion system, are a complete and unitary seeding system. The tool 12 may include a seed hopper and seed towers, not shown, but shown in later figures. Further, while only a first rank 16 and a second rank 18 are illustrated in FIG. 1, the multi-rank agricultural tool or implement 12 may have a plurality of ranks (i.e., two or more).

The first rank 16 may include a number of row units 22 supported by a longitudinally extending support structure 24. The second rank 18 may include a number of row units 26 supported by a separable longitudinally extending support structure 28. The support structure 28 may include a first section 30 coupled to a second section 32 with a coupler 34. The coupler 34 may include a first connector 33 connected to the first section 30 and a second connector 35 connected to the second section 32. The first section 30 and second section 32 can be connected by engagement of the first connector 33 to the second connector 35 or disconnected by disengagement of the same. The row units 22 and 26, in different embodiments, may be adapted to only deposit fertilizer, to only plant seed, or to both deposit fertilizer and plant seed within the same row unit.

In FIG. 1, the row units 22 of the first rank 16 may be spaced apart at a distance "d". Likewise, the row units 26 of the second rank 18 may be spaced apart at a distance "d". The first rank 16, however, may be laterally offset from the second rank 18 by a distance of one-half d. In this configuration, therefore, if all row units 22 and row units 26 are operable, the spacing of the between each of rows of seed being planted is one-half d.

The implement 12 may include a number of row units 22 and 26, with each of the row units being substantially identically configured, in at least one embodiment. Each row unit may be configured to cut a trench, apply fertilizer to the soil, and to deposit seeds of varying sizes in respective furrows in the soil for raising crops. As seen in FIG. 1, each of the row units typically may include a disk opener, that cuts a trench in which fertilizer is applied, a seed box, that delivers seeds to a seeder, a press wheel to press the soil adjacent to the cut trench, and a closer to move the soil back into the trench to cover the deposited seeds. In the illustrated embodiment, the first rank 16 may support eleven row units and the second rank 18 supports twelve row units. In one embodiment, the first rank is a single unitary tool having one section that is not separable. In another embodiment, the first rank may include two or more sections which are separable.

Figure 2:
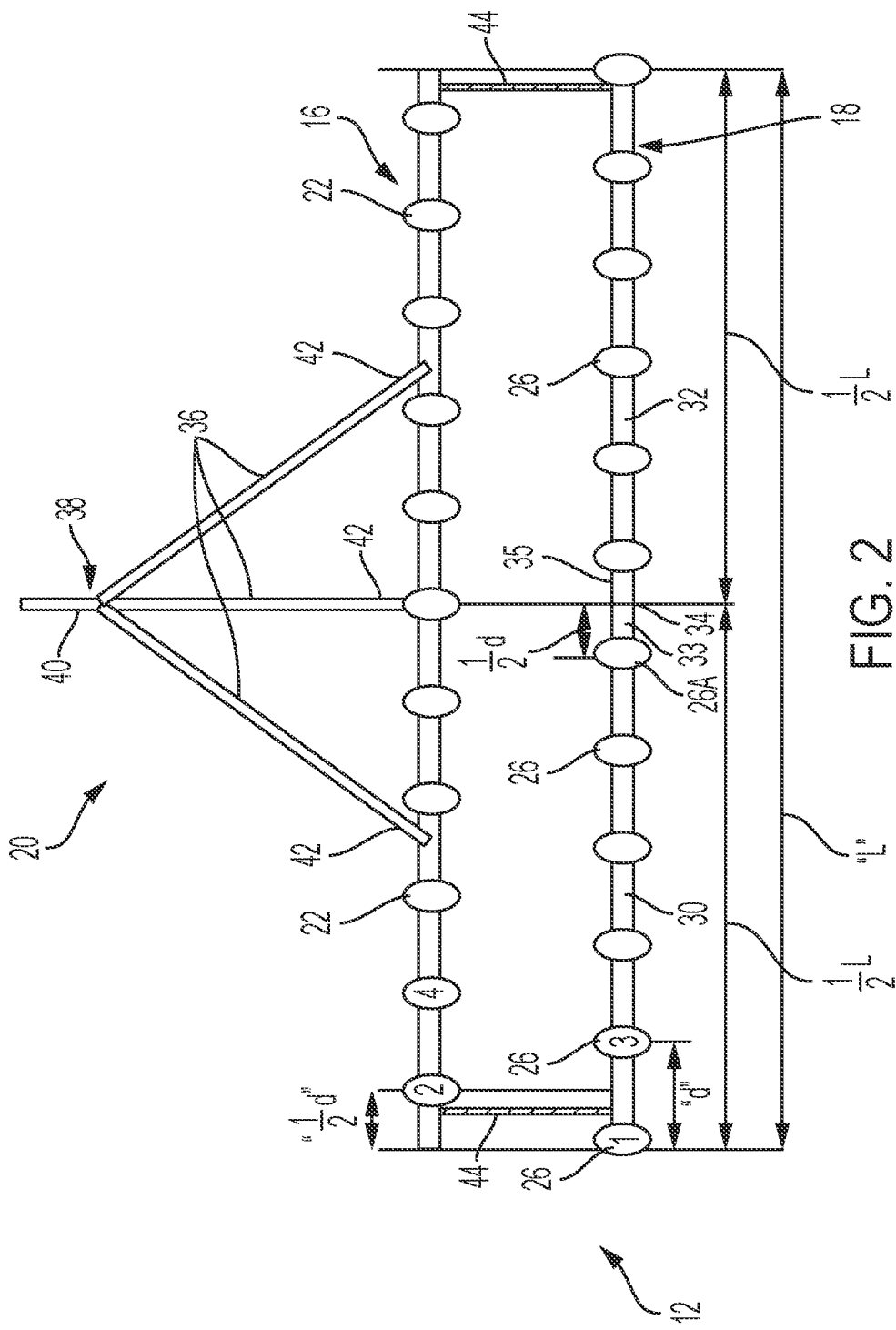
FIG. 2 is a schematic representation of a convertible multi-rank farm implement

FIG. 2 is a schematic representation of the convertible multi-rank farm tool 12. The towing assembly 20 may include a first set of drawbars 36. Each of the first set of drawbars 36 may include a towing end 38, each of which is coupled to towing connector 40. The hitch 15 of FIG. 1 is connected to the towing connector 40. Each of the first set of drawbars 36 may further include a tool end 42 connected to the first rank 16. In this illustration, each of the row units 22 and 26 are schematically illustrated by an oval which represents the positions of each of the row units. The towing assembly may include a second set of drawbars 44 that connects the first rank 16 to the second rank 18, such that the towing assembly 20 pulls both the first rank 16 and the second rank 18 when traversing the field.

A distance "d" is illustrated between two row units 26, labeled as row unit 1 and row unit 3. The second rank 18 may include the coupler 34 which enables the first section 30 to be removably coupled to the second section 32. In this embodiment, the length of the second rank is a length "L". Each of the first section 30 and the second section 32 may be substantially "½ L" and each section 30 and 32 may include one half the total row units of the second rank, or 6 row units. Using the example above of 15 inch rows for corn and 7.5 inch rows for soybean, the distance between adjacent row units in each of the first rank 16 and the second rank 18 may be approximately 15 inches. Since one rank is offset from the other rank, the spacing of rows is "½ d". In addition, the spacing of a row unit 26A from the coupler 34 is also "½ d". Since the distance of row unit 26 is ½ d and the distance of between ends of the first rank 16 to the adjacent row unit 22 is also ½ d, once the first half 30 and second half 32 are moved into position with the first rank 16, the spacing of each row unit along the entire implement is d, or in the case of corn 15 inches.

Figure 3:
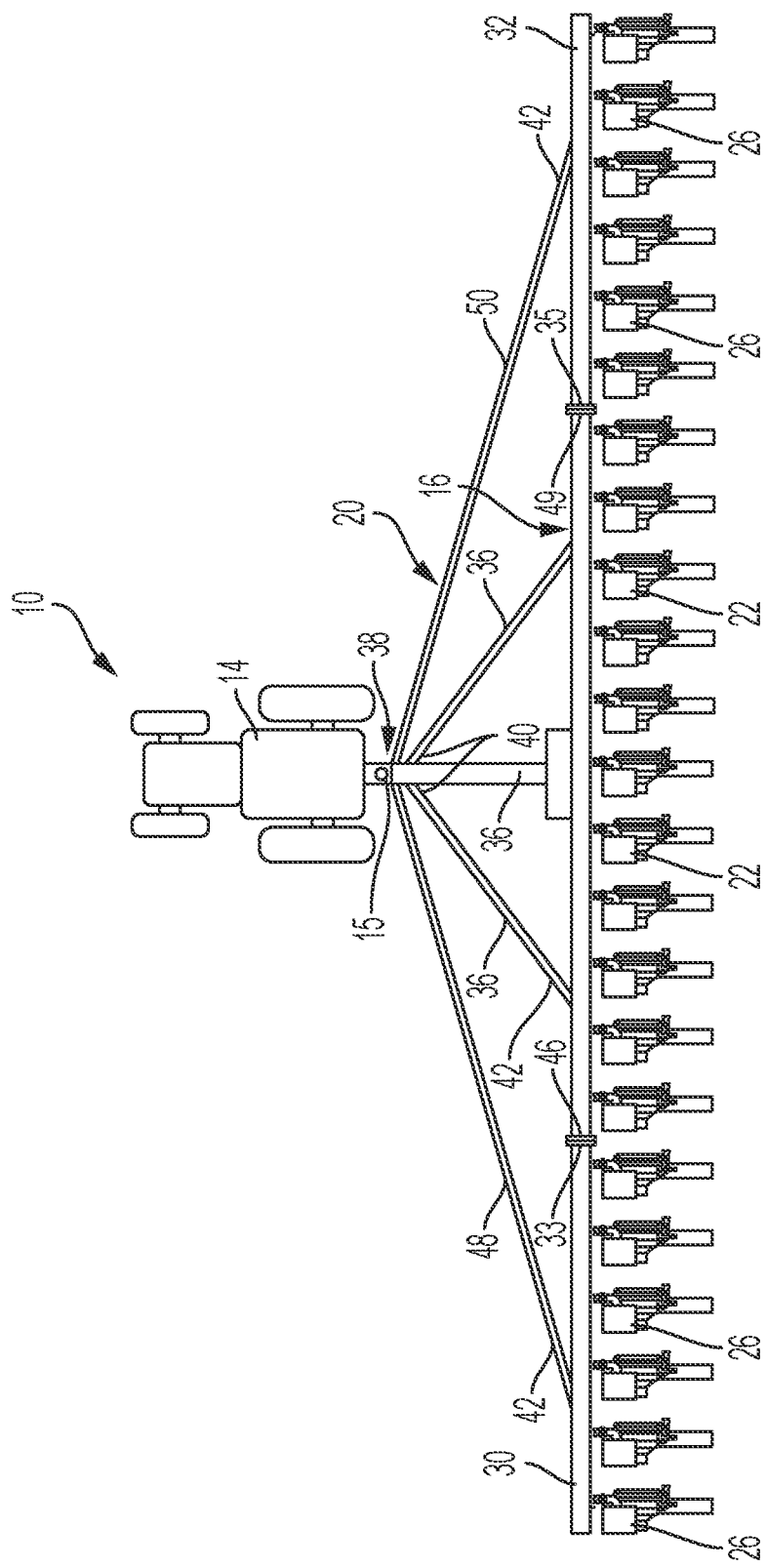
FIG. 3 is a plan view of an agricultural system including a convertible multi-rank farm implement in a second configuration pulled by a work vehicle.
Figure 4:
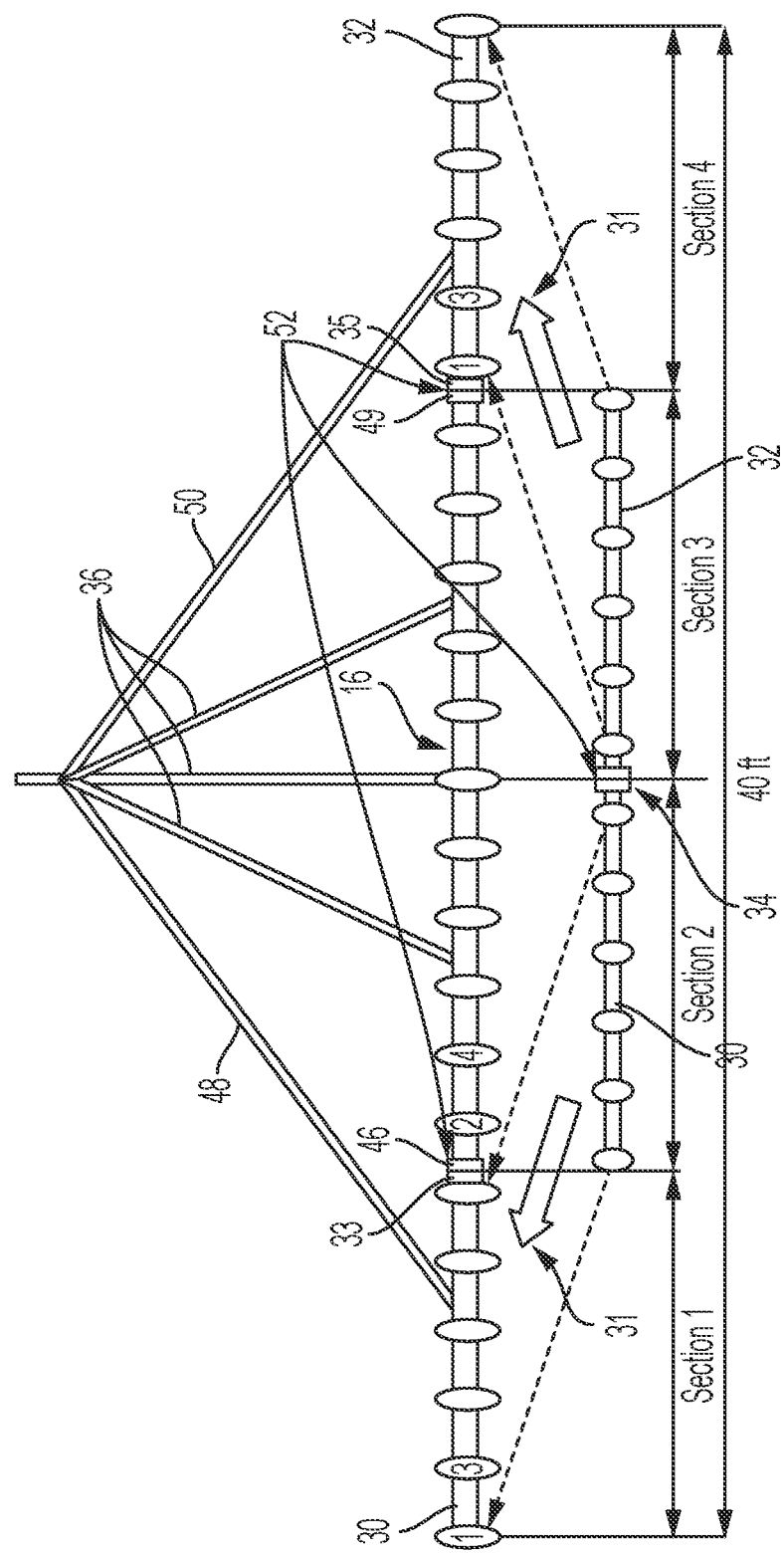
FIG. 4 is a plan view of a convertible multi-rank farm implement wherein a second rank is moved into alignment with a first rank.

As shown in FIG. 3 and FIG. 4, the first section 30 and the second section 32 of the second rank 18 may be decoupled from one another and moved to the ends of the first rank 16 as shown by arrows 31 in FIG. 4. In this embodiment, the tool may be a double size tool. Once moved, the first section 30 and second section 32 may be located at and coupled to opposite ends of the first rank 16. In this configuration, the first connector 33 and the second connector 35 may be disconnected and the first section 30 may be coupled to one end of the first rank 16 with a first connection 46. The second section 32 may be coupled to another end of the first rank 16 with second connection 49 which extends the first rank 16 to a double sized tool. With the extended width, seeding/planting may be performed faster in half of the time. Moreover, the rear rank may be separable from the center at coupler 34. In different embodiments, the rear rank may have its own Seed/Vacuum tubes routings, common electrical connector at the end for Power/CAN wires, and tires for easy rank movement.

Before the first section 30 and the second section 32 are moved and connected to the first rank 16, the set of drawbars 44 may be disconnected from the sections 30 and 32. In different embodiments, the drawbars are completely removable from both the first rank 16 and the second rank 18. In other embodiments, one end of each of the drawbars 44 is disconnected from either the first rank 16 or second rank 18 and the other ends include a rotatable connection about which the drawbars 44 rotate. In this embodiment, the drawbars 44, once rotated, may be moved into alignment with one of the first rank 16 or second rank 18 and the free end of the drawbars 44 may be coupled to the longitudinally extending support structure 24 or 28.

Once the first section 30 and second section 32 are moved adjacently to the first rank 16, the width of the tool may be extended. A first rod or bar 48 may include a towing end that is connected to the towing connector 40 and a tool end of the first rod 48 is connected to the first section 30. A second rod or bar 50 may be connected to the second section 32. In one embodiment, the first rod 48 and second rod 50 may be completely separable from the implement 12 and only moved into position when converting the convertible implement to a one row implement. In another embodiment, the first rod 48 and the second rod 50 are each adjustable. In one embodiment, each of the adjustable rods 48 and 50 are retractable and extendable to enable the rods to retract to a length needed when the implement is configured for a two rank implement and to extend to a length sufficient to reach the first section 30 and the second section 32. In this case, the rods 48 and 50 when retracted may be located on top of or adjacent to one or two of the drawbars 36. With the connections of first rod 48 and second rod 50 to the respective sections 30 and 32, the entire implement 12 may be converted from a two row implement to a one row implement. Each of the first rod 48 and second rod 50 include a tool end to be connected to the first rank.

When the first section 30 and the second section 32 are moved in line with the support structure of the first rank 16, the connection of the first connector 33 to first connection 46 and the connection of second connector 35 to second connection 49 may be fixed together and form a locking mechanism which is substantially rigid to maintain the alignment of the first rank 16, the first section 30, and the second section 32, when being pulled by the tractor 14. The coupler 34 of FIG. 4 may also be a locking mechanism to keep sections 30 and 32 locked together when the implement 12 is in the two rank configuration. In one or more embodiments, the locking mechanisms 33/46 and 35/49 may include mechanical only connectors or include mechanical and electrical connectors. The couplers, in different embodiments, may be one or both of an automatic/manual rank locking mechanism which connects the 2 ranks very tightly and also maintains row to row spacing as per the tool configuration.

Figure 5:
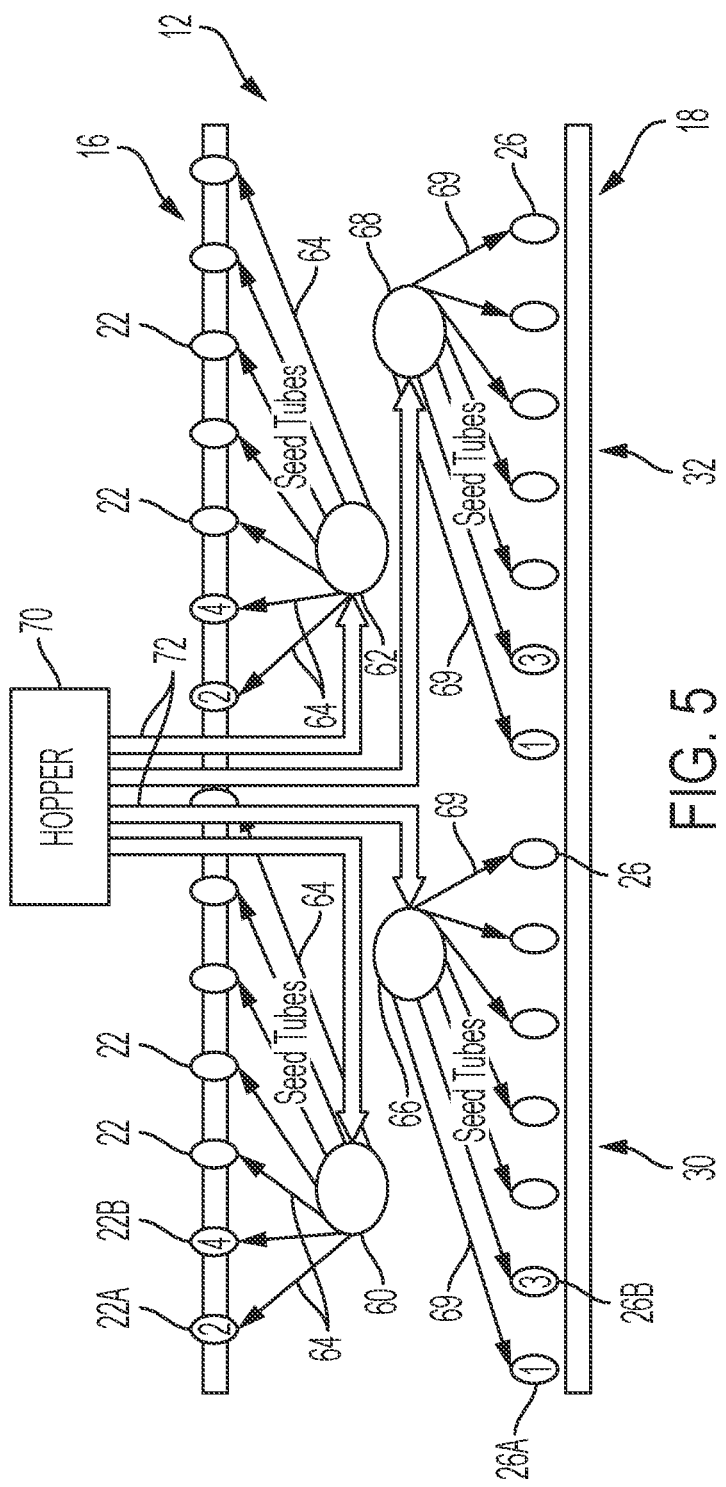
FIG. 5 is a plan view showing seeding devices of a convertible multi-rank farm implement before being converted to a one rank farm implement.

FIG. 5 is a plan view showing seeding devices of a convertible two rank farm implement 12 before being converted to a one rank farm implement. The first rank 16 may include the plurality of row units 22, the location of each row unit 22 being indicated by an oval. Each of the row units 22, in this embodiment which are seeders, may be connected to a first front seed tower 60 and a second front seed tower 62 with seed tubes 64. The second rank 18 may also include a plurality of row units 26, each of which is connected to a first rear seed tower 66 and a second rear seed tower 68, with seed tubes 69. Each of the seed towers 60, 62, 66, and 68 may be operatively connected to a centrally located seed hopper 70 by primary hoses 72, also known as primaries, each of which provides seed to the respectively connected seed towers. In this configuration, the row units may be effectively spaced approximately 7.5 inches apart, by being offset, to deposit seeds. Consequently, in this embodiment, row unit 26A deposits seeds in a first row of the field and row unit 22A deposits seeds in a second row of the field. Row unit 26B consequently deposits seed in a third row of the field and row unit 22B deposits seed in a fourth row of the field. As shown in FIG. 5, the two outer primaries 72, connected to seed hopper 70, may be individually connected to the first front seed tower 60 and the second front seed tower 62. The two inner inlet hoses (primaries) 72 may be individually connected to the first rear seed tower 66 and the second rear seed tower 68.

Figure 6:
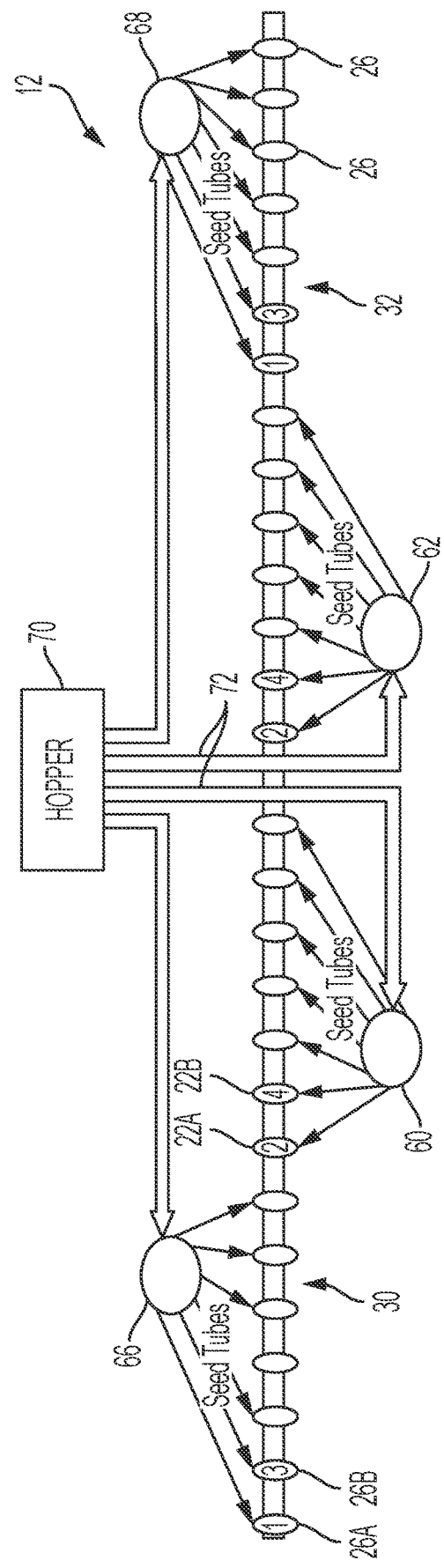
FIG. 6 is a plan view showing seeding devices of a convertible multi-rank farm implement after being converted to a one rank farm implement.

FIG. 6 illustrates the location of seed towers 60, 62, 66, and 68 when the first section 30 and the second section 32 of rear rank 18 are moved to the ends of the front rank 16. During rank movement, the operator may relocate the seed tubes 64 or the seed tubes 69 to maintain the order for the row units to deposit seeds. In another embodiment, where the implement 12 does not include a central hopper 70, each row unit may include its own seed hopper.

In a further embodiment, the operator moves the inlet hoses to a different ones of the seed towers to control the connected sections individually when the rear rank 18 is moved in line with the front rank 16. With this connection, the farm implement 12 may be configured as a single rank tool having multiple sections with the additional rows of the rear rank 18 aligned longitudinally with the rows of the front rank. Each of the rows, of the newly configured single front row, in this embodiment, may be capable of being controlled individually so that the seed placement of each row is controllable. In addition, each of the rows of the entire rank are assignable as rows of a section. For instance, a section control algorithm accessible through a section command user interface 106 may be adapted to enable defining the number of rows in a section. A section then includes rows which, in some embodiments, were assigned to different sections in another configuration. Once configured, each of the newly formed sections may be individually controllable by the section control algorithm accessed with the section command user interface 106.

Figure 7:
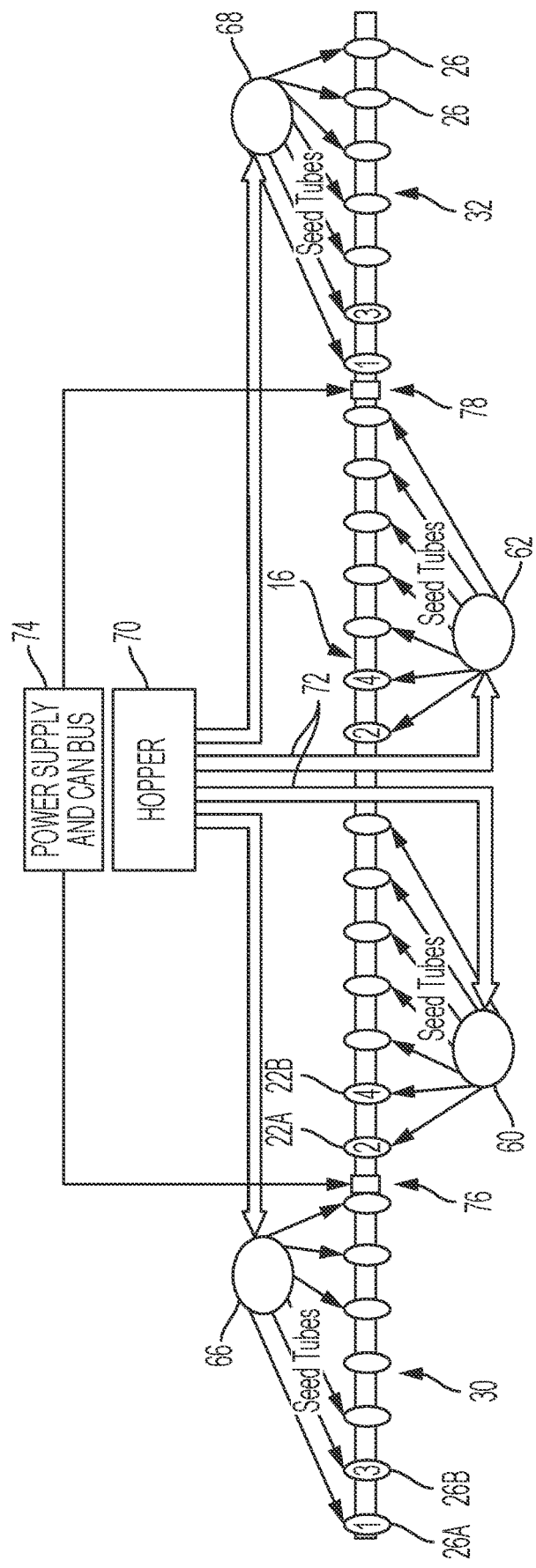
FIG. 7 is a plan view showing electrical power connections and control signal connections to the farm implement.

FIG. 7 is a plan view showing electrical power connections and control signal connections to the farm implement 12. Once the sections 30 and 32 are moved to respective ends of the first rank 16, connections may be made between one end of the section 30 to one end of the first rank 16 and between one end of section 32 to another end of first rank 16 as previously described in for FIG. 3. Each of the connections made between adjacent ends of the first rank 16 and sections 30 and 32 may be connected to a power supply and CAN bus 74. For instance, an electrical connector 76 connecting section 30 to first rank 16 provides both power and CAN signals to section 30. Likewise, an electrical connector 78 connecting section 32 to the other end of first rank 16 may provide both power and signal communication with CAN bus 74 to section 32. The first rank 16 may receive power from only one of the connectors 76 or 78 or receives power from each of the connectors 76 and 78 to power and provide signal communication CAN instructions to portions of the first rank 16. In other embodiments, connectors for only CAN instruction may be separate from power connectors, which provides isolation between power and CAN instructions. When the connectors 76 and 78 are not used in the multi-rank configuration, then connects 76 and 78 may be open and caps to cover the connectors are put in place to protect the open ends from dust and weather.

Figure 8:
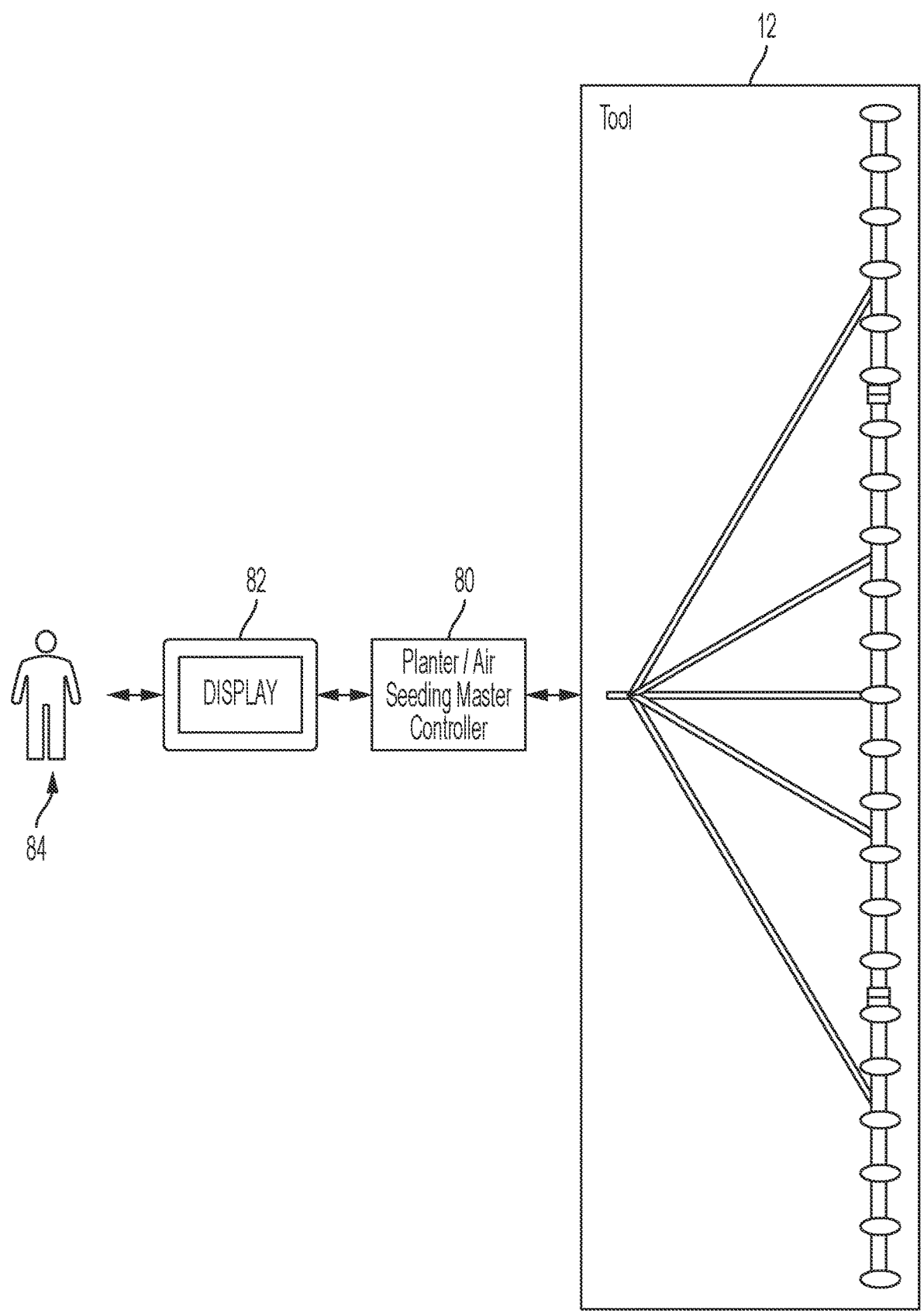
FIG. 8 is a plan view of a controller connected to a tool and a display.

In FIG. 8, each of the electrical connectors 76 and 78 of FIG. 7, may be electrically connected to a planter/air seeding master controller 80, which is located on the farm implement or tool. Other locations of the master controller 80 are contemplated, such as on the tractor 14. The controller 80 may execute or otherwise rely upon computer software applications, components, programs, objects, modules, or data structures, etc. Software routines, i.e. software, resident in the included memory, may be executed in response to the signals received from the sensors or through CAN buss. In other embodiments, the computer software applications may be located in a memory internal to the controller 80 or external to the controller 80, including the "cloud". The executed software may include one or more specific applications, components, programs, objects, modules or sequences of program instructions typically referred to as "program code". The program code may include one or more program instructions located in memory and other storage devices that execute the instructions that are resident in memory, which are responsive to other program instructions or machine settings generated by the system.

A display 82 may be connected to the master controller 80 that generates one or more display screens, and their content, that are viewed by an operator 84 of the vehicle 14. In one embodiment, the display 82 is located in a cab of the vehicle 14 and is connected to the CAN buss 74 by wired connection. In another embodiment, the display 82 is wirelessly connected to the CAN buss 74. In a further embodiment, the display 82 is located on a cellular device that is removable from the vehicle 14 and is connected wirelessly to the CAN buss 74 through a "cloud" system that utilizes the internet. In FIGS. 11-14, additional illustrations of a user interface 106 to be displayed on display 82 are provided.

Figure 9:
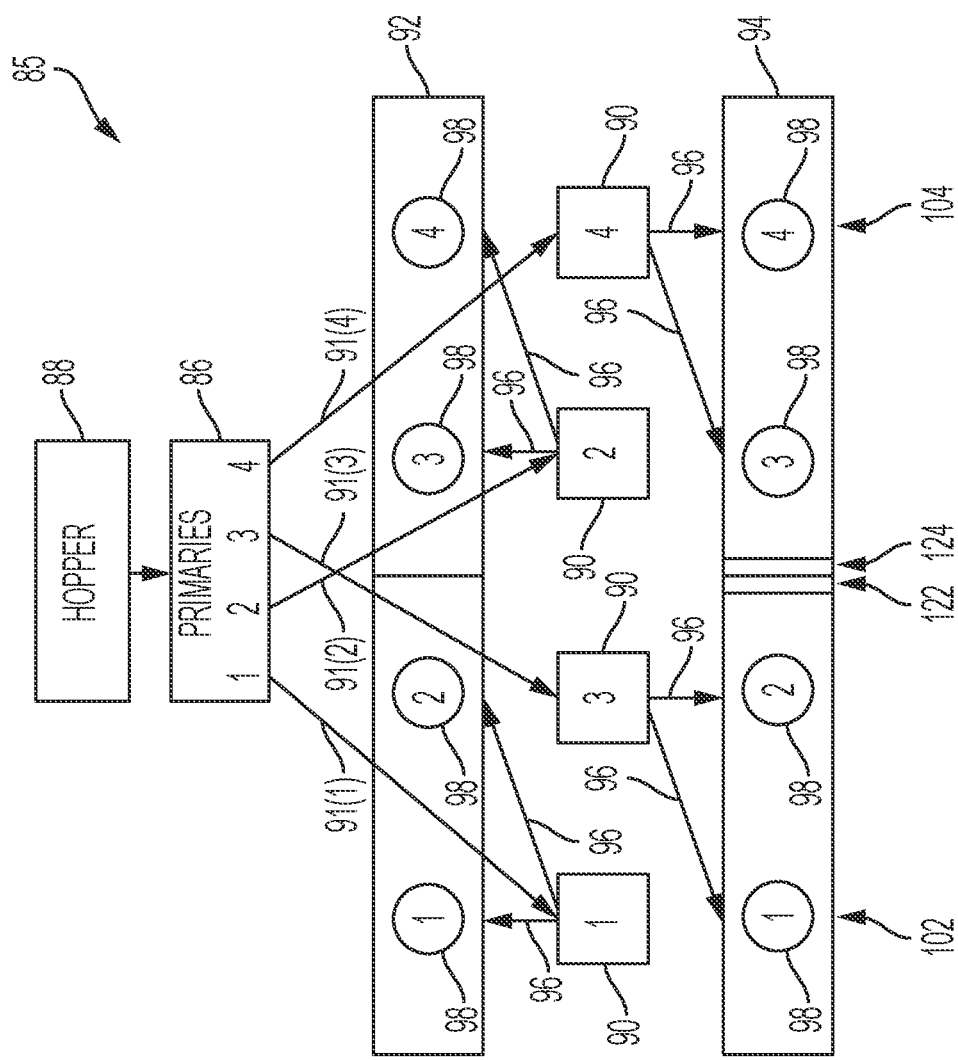
FIG. 9 is a schematic drawing of a multi-row tool having primary connections connecting a seed hopper to seed towers.

FIG. 9 is a schematic drawing of a two row tool 85 illustrating primary connections 86 from a seed hopper 88 to seed towers 90. Each of the primaries 86 may be primary seed tubes 91 that transfer seed from the hopper 88 to one of the seed towers 90. In one or more embodiments, the hopper 88 may include one or more hoppers 88 that holds a large quantity of seed which is distributed by each of the primaries 86 to the seed towers 90. The seed towers 90 may be supported by the tool 20 of FIG. 1, for instance, and the hopper 88 may be supported by a seeding supply apparatus, pulled by the tool 20 and connected to the seed towers 90 by the primaries 86. In FIG. 9, seed tower 90(1) and seed tower 90(2) may be located on a top row 92, which is which is located immediately behind the tractor 14 when pulled through a field. The seed tower 90(3) and seed tower 90(4) may be located on a bottom row 94 which is located behind the top row 92 when pulled by the tractor 14. The illustration of FIG. 9 is schematic in nature, and does not necessarily represent the position of the hopper 88 with respect to the top row 92 and the bottom row 94. Typically, the hopper 88 may be located in a last positon behind the tractor 14 and each of the rows 92 and 94. As used herein, the top row is the first row located behind the tractor when moving through the field and the bottom row is the second row located behind the tractor that follows the top row.

The seed towers 90(1) and 90(2) may be each individually coupled to respective row units 98 by seeding tubes 96 of top row 92. The seed towers 90(3) and 90(4) may be each individually coupled to the respective row units 98 of bottom row 94. In this configuration, the row units of bottom row 94 may be offset with respect to the row units 98 of top row 94 in the same manner as previously described. To convert the two row tool 85 to a single row tool 100 of FIG. 10, a left side portion 102 of back row 94 may be moved and coupled to a left side (as illustrated) of top row unit 92. A right side portion 104 of back row 94 may be moved and coupled to a right side of top row 92. In this embodiment, however, primary seed tubes are disconnected from the configuration of FIG. 9 and reconnected in the configuration shown in FIG. 10. Primary tube 91(1) may be now connected to seed tower 90(3) and primary tube 91(2) may be now connected to seed tower 90(1). Additionally, primary tube 91(3) is now connected to seed tower 90(2) and primary tube 91(4) remains connected to seed tower 90(4).

When changing the two row tool 85 to the single row tool 100, the sections 30 and 32 of the second rank may be moved laterally, and not clockwise, with respect to the first rank to keep the row units and seed dropping locations directed toward the front side. The primary tubes 91 may be disconnected and reconnected to a different seed tower to reflect the new order of the seed towers, when viewed from left to right, as illustrated. The reconnection provides for screen display on the display 82 of connections that are arranged in the different fashion resulting from moving section 102 to the left side of the first rank and moving section 104 to the right side of the first rank.

In another embodiment, the controller 80 may organize a display of rows, and corresponding row units, on the display 82 without the actual seed tubes being reconnected. The organization of the row units within a section may be based on a user configured input. In order to do this, without scope of error, the user initiates a setup sequence on the display which gather details on what sections and/or rows are being rerouted. An updated location of each of the row units of the rerouted layout may be displayed at the end of a rerouting sequence. Once the controller 80 completes the rerouting sequence, the controller 80 may display the rerouted configuration and directs the user to accept the rerouted configuration. Upon acceptance of the rerouted configuration, the system performs a power cycle to determine if the reorganized connections are correct. If correct, the user manually makes the accepted reconnections before powering up the system again. The software, in different embodiments, may also include a validation sequence where it would query each row to confirm if the rerouting was completed as per the configuration done initially at the display 82.

Figure 11:
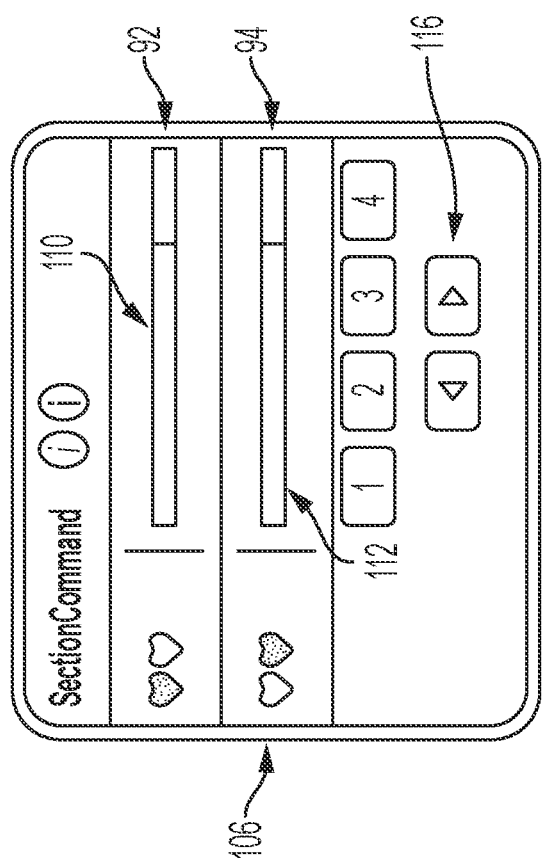
FIG. 11 is a section command screen provided on a user interface of a display device for a two rank agricultural tool.
Figure 12:
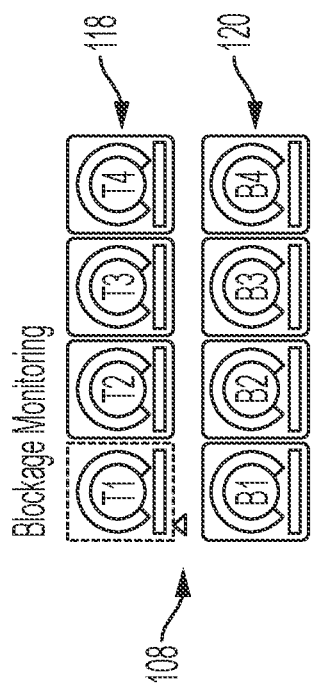
FIG. 12 is a blockage monitoring screen provided on a user interface of a display device for a multi-rank agricultural tool.
Figure 13:
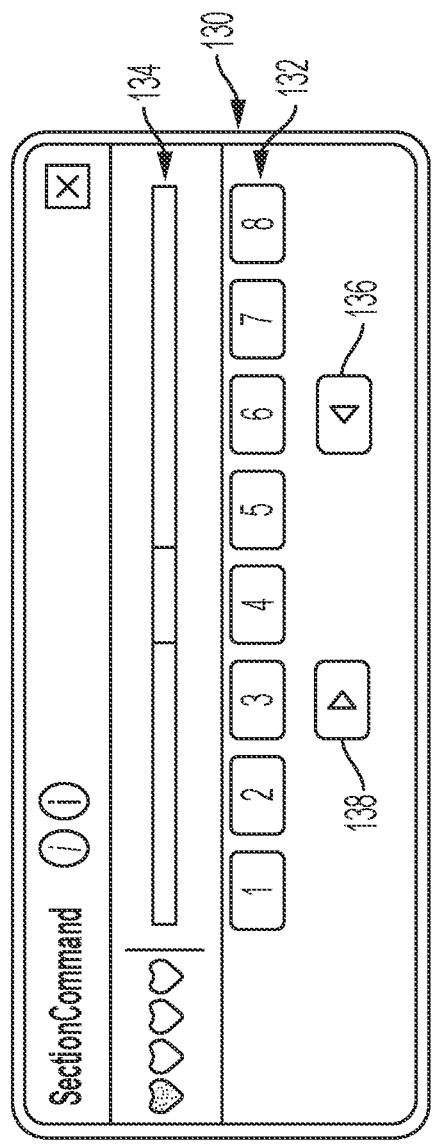
FIG. 13 is a section command screen provided on a user interface of a display device for a one rank agricultural tool.

In one embodiment, the display 82 displays the section command user interface 106 of FIG. 11 and a blockage monitoring user interface 108 of FIG. 12. As seen in FIG. 11, and prior to reconfiguring the tool 85 to a single row, the user interface 106 schematically displays the state of the top row 92 and the bottom row 94 of FIG. 9. By selecting the upper row 110 of FIG. 11 when the tool 85 is configured as illustrated in FIG. 9, a state of each of the four row units 98 of the top row 92 of tool 85 is shown. By selecting the lower row 112, a state of each of the four row units 98 of the bottom row 94 of tool 85 is shown. A set of numbers 114, in this configuration 1 through 4, selected by left and right directed arrows 116, is used to select one of the units of upper row 110 or lower row 114 depending on which row is selected.

The user interface 108 may display a screen that enables the user to determine the status of each of the primary seed tubes 91. Each of the seed tubes may include a sensor (not shown) which monitors tube blockages. A top row 118 may include user selectable buttons, T1-T4, which if selected displays another screen with additional information regarding the selected seed tube. The bottom row 120 may include user selectable buttons, B1-B4, which if selected displays another screen with additional information regarding the selected seed tube.

Figure 10:
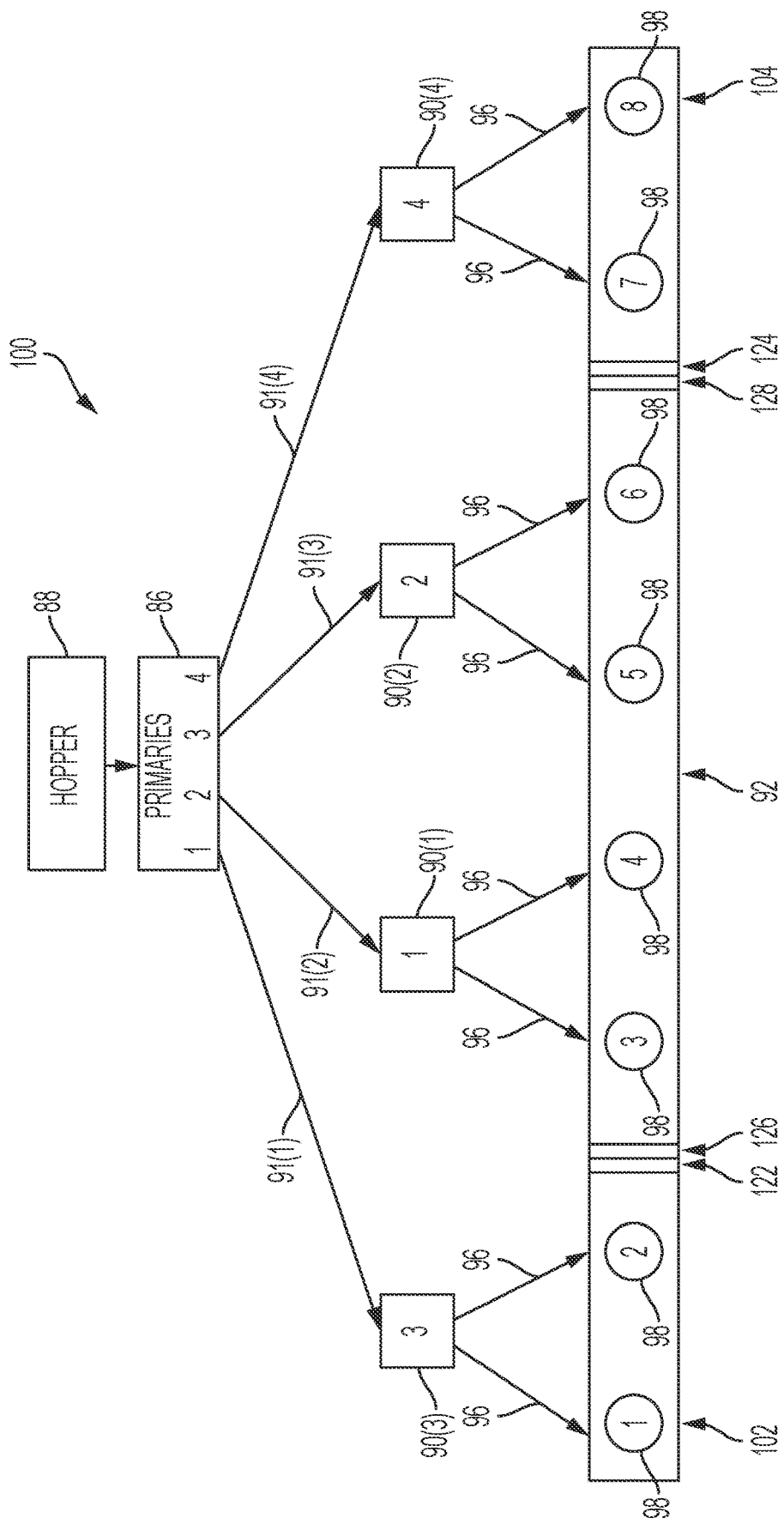
FIG. 10 a schematic drawing of a one row tool having primary connections connecting a seed hopper to seed towers.

When converting the two row tool 85 of FIG. 9 to the one row tool 100 of FIG. 10, connectors 122 and 124 may be disconnected from the configuration of FIG. 9 and each connector 122 and 124 is reconnected to connectors 126 and 128 located at the ends of top row 92. The electrical connections of connectors 122, 124, 126, and 128 provide status information of the new connections over the CAN bus 74 and to the controller 80. Connection 122 may be coupled to connection 126 and connection 124 may be connected to connection 128. In this configuration, the towers of the 90(3) and 90(4) are located at ends of top row 92. To reflect this change in position, a user interface 130 of FIG. 13 may be displayed on display 82 having a single row of selector buttons 132, the status of which is provided by a status row 134. Since the primary tubes 91 have been connected in new and different connections, selection of button number 1 provides status information and enables status commands to be displayed for row unit 1 of section 102. Likewise, the status of the remaining row units of section 102, section 92, and section 104 may be sequentially displayed as numbers 2 through 8. A left button 136 and a right button 138 may be provided to enable/disable the sections on the display 82 from left/right. Each (left/right) button click will enable/disable (left/right) sections starting from the far (left/right) end.

Figure 14:
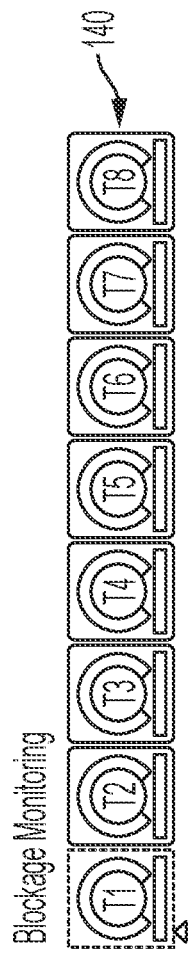
FIG. 14 is a blockage monitoring screen provided on a user interface of a display device for a one rank agricultural tool.

With the relocation of the primary tubes 91, a display screen 140 of FIG. 14 may be displayed at the user interface 106 to enable the user to determine the status of each of the seed tubes 96 and/or each of the row units. Each of a plurality of status buttons T1-T8, upon selection, provides the requested status of the selected seed tubes 96 and/or row units.

Figure 15:
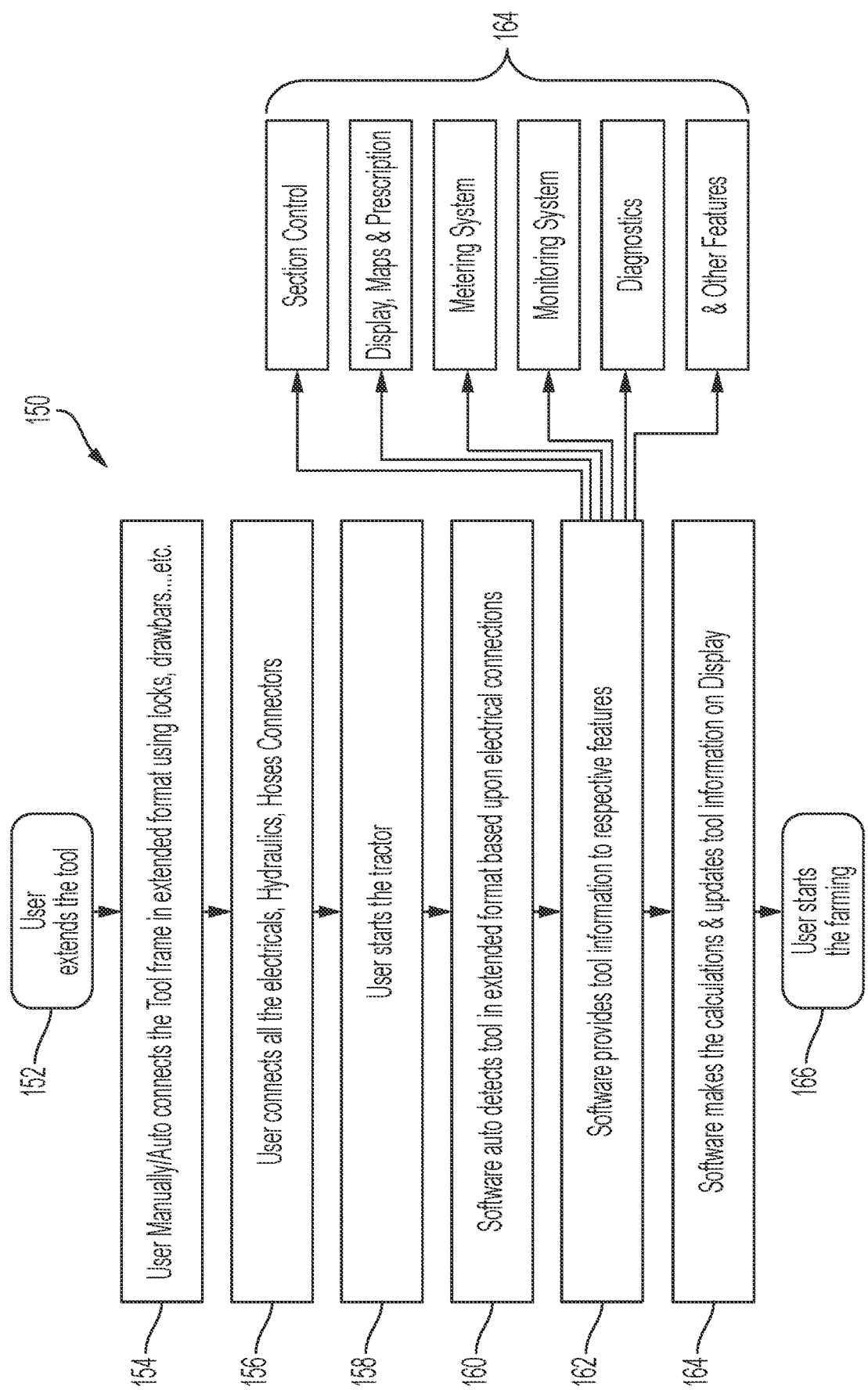
FIG. 15 illustrates one embodiment of a process block diagram to convert an agricultural tool from a multi-rank agricultural implement to a single rank agricultural implement; and Corresponding reference numerals are used to indicate corresponding parts throughout the several views.

FIG. 15 illustrates one embodiment of a process block diagram 150 to convert an agricultural tool from a two rank agricultural implement to a single rank agricultural implement. Initially, a user or operator, or other individual such a maintenance technician, may determine at block 150 that a multi-rank tool (e.g., a two rank tool) is to be converted into a one rank tool, i.e. a single row, to extend the length of the tool. The user may manually move the two portions of the second rank to opposite ends of the first rank at block 154. The user then manually connects one portion of the second rank to a first end of the first rank and another portion of the second rank to the other end of the first rank at block 156. The mechanical connections may include, but are not limited to, locks, drawbars, and cotterpin joints. In one embodiment, the mechanical connections include electrical connections as well, including for instance male and female connections. The electrical connections may provide for the transmission of status information of the location of the first portion and the second portion of the former second rank with respect to the first rank. In some embodiments, the electrical connections may be coupled to status sensors that provide the status of seed hoses, for instance indicating blockage conditions.

Once the tool has been converted to a single row tool, the user may connect any other electrical connections that are not made by the connections of block 154, any hydraulic connections, and any hose connections including seed delivery hoses and air delivery hoses used to deposit seed. See block 156.

Once the connections have been made, the user may start the tractor at block 158. Upon starting the tractor and turning on any features that require manual activation, the software located in an internal or external memory accessible by the controller 80, performs an auto-detect function at block 160. The software may determine the status of one rank tool based on the newly connected electrical connections to determine location of seed tower, primary hoses, and seed transport hoses. Upon completion of the auto-detect function, the software generates tool status information at block 162. The status information may be accessible for display on the display 82, including accessible display screens as described herein, or other display screens. The status information provides tool information to respective features at blocks 164. These features include, but are not limited to: section control, display features including maps and prescription, a metering system, such as used to deliver seed to the seed units, monitoring systems, diagnostics, and other features.

Section control may be an ISO (International Standards Organization) defined implementation that allows the individual sections of the implement to be turned off/on at specific locations on the field. It provides for efficient utilization of the system to avoid overlap/wastage of product.

Like section control, the Prescription feature may enable the application of variable rates of product based on the physical location of the zones in a farm. An Rx or "Prescription" map is an electronic data file (shapefile) containing specific information about input rates to be applied in every zone of a field. A shapefile may be a simple, non-topological formatted file for storing geometric locations and attribute information of geographic features.

Monitoring systems may include one or more software modules that keep track of the operational aspects of a machine function. For example, in a planter, a seed sensor device may provide feedback signals representative of the operation of each of the row units. The sensor devices for each row unit may provide seed dispensing conditions to the controller 80 to calculate the row unit efficiency with respect to skips (missing a seed deposit along a row), doubles (depositing 2 or more seeds at a single location), and seed spacing. Other seed status conditions to diagnose the operation of the machine are contemplated.

The diagnostics feature may include a method or process to provide feedback on the various sensors/actuators in the system and their status to the user. It may also have diagnostic tests that the user runs to diagnose or troubleshoot any sub-system of the planter.

Once the software has determined the tool information at block 162, the software provides calculations, if needed, to determine status information at block 164. The calculated status information may be accessible for display by an operator on the display 82 upon selection of the appropriate features. Once the software has determined the status tool information, the user can start the farming operation at block 166. While farming, the process 150 updates the tool information at block 164.

In other embodiments, the software may be configured to auto update one or more of the feature. In one embodiment, the software provides an auto tool configuration that recognizes the reconfiguration of the two rank tool to the one rank tool and vice versa. During or upon reconfiguration, the software updates connections locations of seed towers and row units on the display. In addition, the software may automatically set tool parameters like width and row spacing. For the software to configure these parameters, the user may input data into a setup page that would gather the necessary information about spacing, row layout etc. and then populate the information on the display The software in one or more embodiments, provides individual section control, prescription, documentation and mapping. In some embodiments, the software may also provide adjustment of a metering device used to provide a measure amount of seed based on changes from one tool configuration to another tool configuration. Additional embodiments includes a relative flow monitoring system that populates row and tower information as per the tool configuration. Also, the software may be configured to automatically detect row and/or tower unit addressing, diagnostics, and metering on/off delays.

The extended tool configuration save overall farming costs like manpower, fuel, and uptime. In addition, the user or operator can easily switch between dual rank configuration to the extended rank configuration before starting farming activity. The extended tool configurations may also increase farming productivity, save time, and increase earnings.

While exemplary embodiments incorporating the principles of the present disclosure have been described hereinabove, the present disclosure is not limited to the described embodiments. For instance, while a two rank system is described, other numbers of ranks are included. Systems including multiple ranks, such as three or more are contemplated. Also, while one rank of the two rank system is described having two sections, ranks having other numbers of sections are contemplated. In other embodiments, the second rank includes more than two sections which are located at the first rank. This application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A convertible multiple rank agricultural implement for being towed by an agricultural vehicle comprising:
    a towing assembly including a first set of drawbars and a second set of drawbars, wherein the second set of drawbars includes adjustable drawbars, wherein each of the adjustable drawbars includes a first part that slides respectively with a second part, wherein the adjustable drawbars include a retracted position and an extended position;
    a first rank coupled to the towing assembly, the first rank including a first plurality of row units longitudinally spaced along a longitudinally extending support structure;
    a second rank coupled to the first rank, the second rank including a first section connected to a second plurality of row units, and a second section connected to a third plurality of row units, wherein the first section and second section, in a first configuration, are coupled together with a coupler located at adjacent ends of the first section and second section when the second rank is offset and spaced from the first rank, and wherein the first section and second section, in a second configuration, are spaced apart and longitudinally aligned with the longitudinally extending support structure of the first rank; and
    wherein the first set of drawbars is connected to the first rank and the second set of drawbars is coupled to the second rank.

2. The convertible multiple rank agricultural implement of claim 1 wherein the adjustable drawbars include a towing end adapted to be connected to the agricultural vehicle and a tool end adapted to be connected to the one of the first rank or the second rank, wherein the towing end is closer to the agricultural vehicle than the tool end.

3. The convertible multiple rank agricultural implement of claim 2 wherein the adjustable drawbars in a first position are coupled to the first rank and the second rank when the first rank is offset from and spaced from the second rank.

4. The convertible multiple rank agricultural implement of claim 3 wherein the adjustable tow bars in a second position are coupled to the second rank and the towing assembly when the first section and second section are arranged in the second configuration.

5. The convertible multiple rank agricultural implement of claim 4 wherein the adjustable tow bars in the second configuration are in the extended position.

6. The convertible multiple rank agricultural implement of claim 1 wherein the coupler of the second rank includes a first part located at a first end of the first section and a second part located at a second end of the second section, wherein engagement of the first part and the second part couples the first section to the second section.

7. The convertible multiple rank agricultural implement of claim 6 wherein the longitudinally extending support structure includes a first connector at one end of the support structure and a second connector at another end of the support structure wherein engagement of the first part with the first connector connects the first section to one end of the support structure and engagement of the second part with the second connector connects the second section to an another end of the support structure in the second configuration.

8. The convertible multiple rank agricultural implement of claim 7 wherein the coupler includes an electrical coupler having a first electrical part and a second electrical part, the first electrical part located at the first end of the first section and the second electrical part located at the second end of the second section, wherein engagement of the first electrical part and the second electrical part electrically couples the first section to the second section.

9. The convertible multiple rank agricultural implement of claim 8 wherein the longitudinally extending support structure includes a first electrical connector at the one end of the support structure and a second electrical connector at the another end of the support structure wherein engagement of the first electrical part with the first electrical connector and engagement of the second electrical part with the second electrical connector electrically connects the first section at the one end of the support structure and electrically connects the second section at the another end of the support structure in the second configuration.

10. A method of converting an agricultural implement having a first tow bar and a second tow bar from a multiple rank agricultural implement to a single rank agricultural implement, the method comprising:

providing a first rank, the first rank including a first plurality of row units longitudinally spaced along a longitudinally extending support structure;

providing a separable second rank having a first section and a second section, wherein each of the first section and the second section include respectively a second plurality of row units and a third plurality of row units;

providing a mechanical coupler system having a first mechanical part and a second mechanical part, the mechanical coupler system located at adjacent ends of the first section and the second section;

separating the separable second rank into the first section and the second section;

adjusting a length of the first tow bar to enable connection of the first section to one end of the first rank;

adjusting a length of the second tow bar to enable connection of the second section to another end of the first rank;

moving the first section and the second section into longitudinal alignment with the first rank;

connecting the first section to the one end of the first rank; and connecting the second section to the another end of the first rank;

providing a controller operatively connected to the mechanical coupler system, wherein the mechanical coupler system includes electrical connections adapted to provide status information of the coupling of the first and second mechanical parts, wherein the controller identifies an updated location of the first section and the second section with respect to the first rank after the first section and second section are coupled to the first rank.

11. The method of claim 10 wherein the controller, based on the updated location of each of the first section and second section with respect to the first rank, further identifies a location of each of a plurality of first row units of the first section, a location of each of a plurality of second row units of the second section, and a location of each of a plurality of first rank row units of the first rank, and further wherein the controller causes a display to display an updated location of each of the plurality of first row units, an updated location of each of a plurality of second row units, and an updated location of each of a plurality of first rank row units of the first rank.

12. An agricultural system for cultivating crops comprising:

an agricultural work vehicle including a towing hitch; and a towing assembly adapted to couple to the towing hitch, the towing assembly including a first set of drawbars and a second set of drawbars, wherein the second set of drawbars includes adjustable drawbars, wherein each of the adjustable drawbars includes a first part that slides respectively with a second part, wherein the adjustable drawbars include a retracted position and an extended position;

a first rank coupled to the first set of drawbars, the first rank including a first plurality of row units longitudinally spaced along a longitudinally extending support structure;

a second rank coupled to the second set of tow bars, the second rank including a first section connected to a second plurality of row units, and a second section connected to a third plurality of row units, wherein the first section and second section, in a first configuration, are coupled together with a coupler located at adjacent ends of the first section and second section when the second rank is offset and spaced from the first rank, and wherein the first section and second section, in a second configuration, are spaced apart and longitudinally aligned with the longitudinally extending support structure.

13. The agricultural system of claim 12 wherein the adjustable drawbars include a towing end adapted to be connected to the agricultural vehicle and a tool end adapted to be connected to the one of the first rank or the second rank, wherein the towing end is closer to the agricultural vehicle than the tool end.

14. The agricultural system of claim 13 wherein the adjustable tow bars in the second position are coupled to the second rank when the first section and second section, in the second configuration, are spaced apart and longitudinally aligned with the longitudinally extending support structure.

* * * * *